June 21, 1932.  R. HOE  1,864,304
POWER UNIT
Filed Jan. 2, 1930  3 Sheets-Sheet 1

INVENTOR
Robert Hoe
BY
Gifford, Scull & Burgess
ATTORNEYS

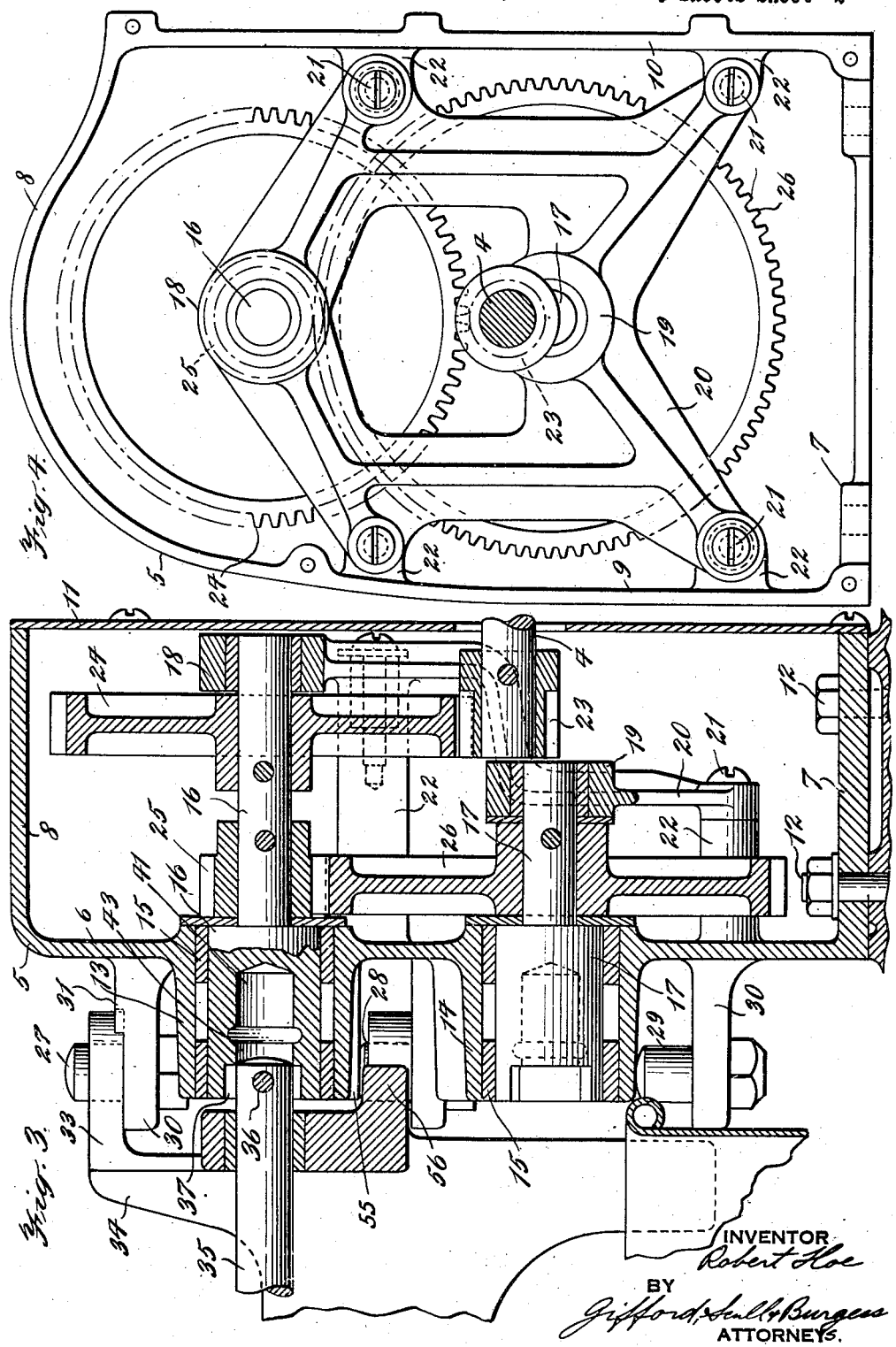

June 21, 1932.   R. HOE   1,864,304
POWER UNIT
Filed Jan. 2, 1930   3 Sheets-Sheet 3
Fig. 5.
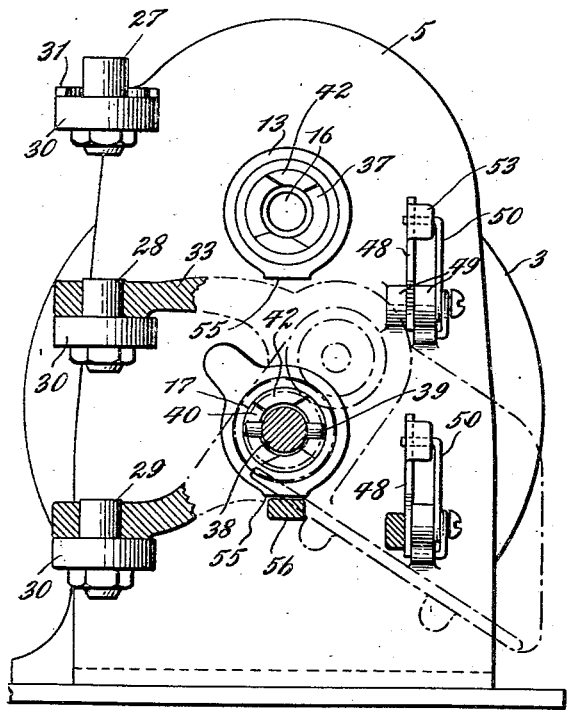
Fig. 6
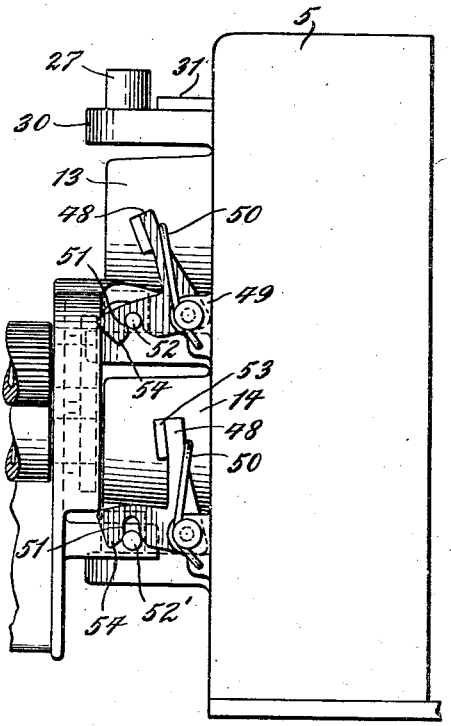
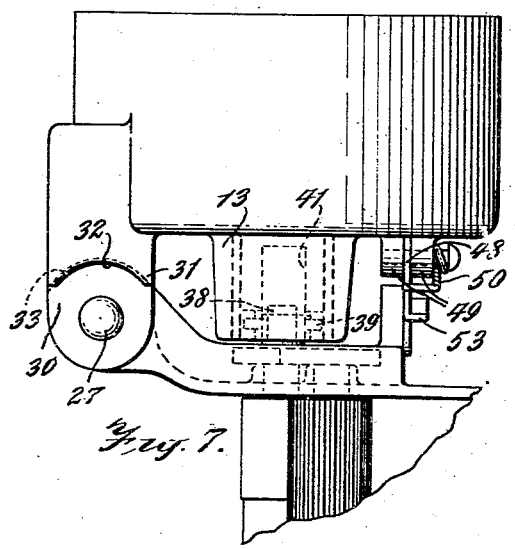
Fig. 7.
Fig. 8.
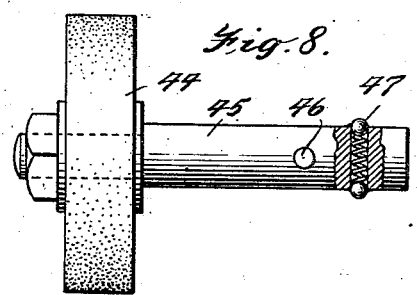
INVENTOR
Robert Hoe
BY
Gifford, Scull & Burgess
ATTORNEYS.

Patented June 21, 1932

1,864,304

UNITED STATES PATENT OFFICE

ROBERT HOE, OF HYDE PARK, NEW YORK

POWER UNIT

Application filed January 2, 1930. Serial No. 418,109.

This invention relates to a novel and improved power unit, the novel features of which will be best understood from the following description and the annexed drawings, in which I have shown a selected embodiment of the invention and in which:

Fig. 3 is a vertical sectional view through the casing containing the gearing.

Fig. 4 is a view from the right of Fig. 3, with the casing wall removed.

Fig. 5 is a view from the left of Fig. 3 but showing a different form of device in position.

Fig. 6 is a view from the right of Fig. 5.

Fig. 7 is a plan view of the structure appearing in Fig. 5.

Fig. 8 is a view of another form of device and embodies attaching and driving means.

Figure 2:
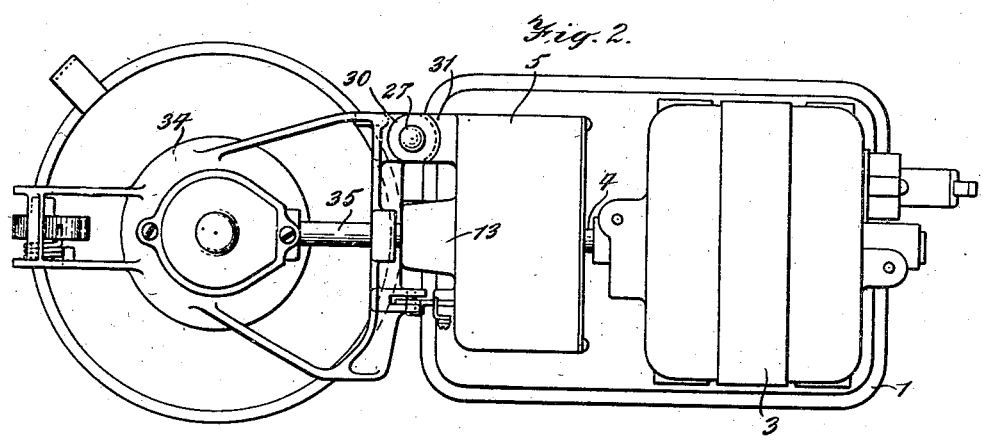
Fig. 2 is a plan view of the structure appearing in Fig. 1.
Figure 1:
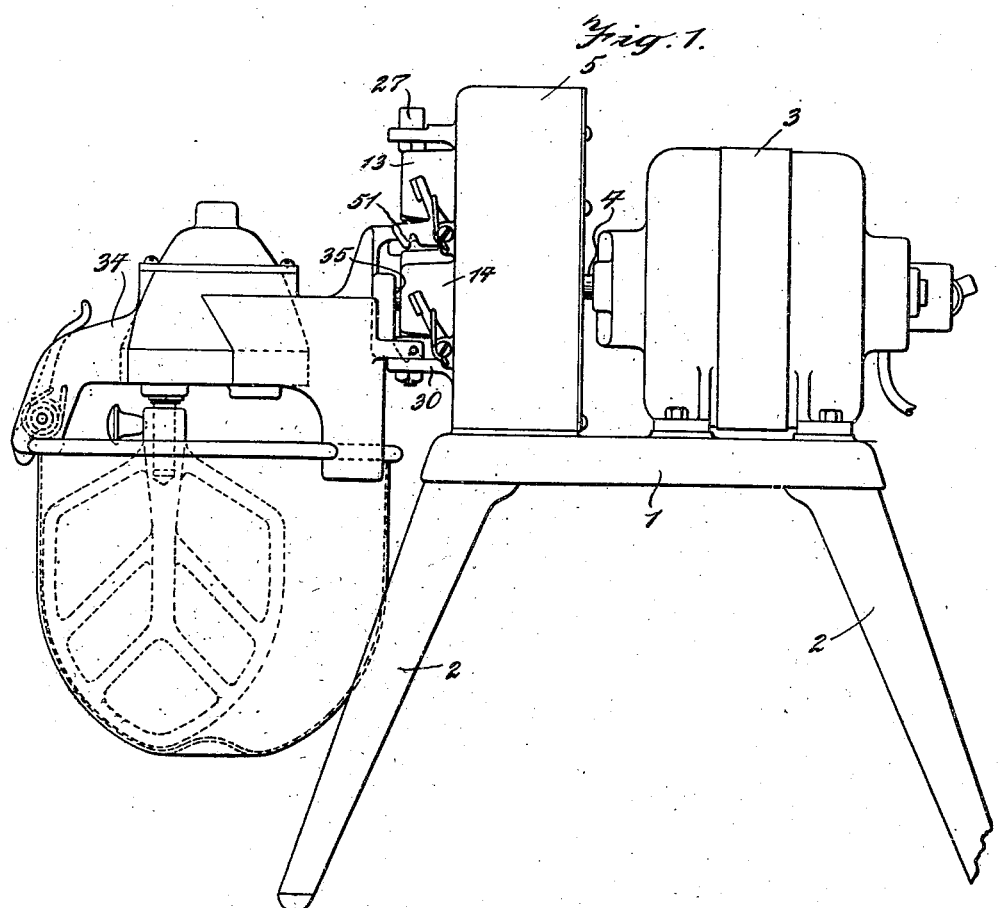
Fig. 1 is a vertical elevation of the power unit having one type of device associated therewith.

Referring first to Figs. 1 and 2, I have shown therein a base 1 supported by legs 2 and carrying a motor 3 having a shaft 4. Also mounted on the base 1 is a gear casing 5 which, as best shown in Fig. 3, is formed of a vertical wall 6 having integral therewith the bottom wall 7, top wall 8 and side walls 9 and 10. The result is an integral box with only one open side which is closed by means of a plate 11. The box may be secured to the base as by bolts 12.

The wall 6 is provided with a plurality of bearings here shown as two in number, these bearings being formed partly in bosses 13 and 14 extending outwardly from the wall, and each boss is provided with bushings 15 within which are received the enlarged ends of shafts 16 and 17. These two shafts are parallel to each other and the enlarged ends disposed in the bosses are provided with clutch elements which will be more fully described later, so that these two shafts form the driving shafts of the power unit.

The shafts 16 and 17 are further supported in bearings 18 and 19 carried on a supporting frame work 20 which is secured to the wall 6 by suitable screws 21. The wall 6 may be provided with bosses or spacers 22 in which these screws may be threaded and, as shown in Fig. 4, these bosses may be connected to the side walls, thus forming a rigid structure.

The end of the motor shaft 4 extends through an opening in the plate 11 into the casing, and has on its end a pinion 23 meshing with a gear 24 on the shaft 16. This arrangement, as will be seen, provides a reduction gearing between the shafts 4 and 16, and a further reduction gearing is provided between the shafts 16 and 17 by the pinion 25 on the shaft 16 meshing with the gear 26 on the shaft 17. By this arrangement, it will be seen that the shaft 16 is rotated in one direction at a relatively high rate of speed, whereas the shaft 17 is rotated in the opposite direction at a relatively low rate of speed. In one embodiment which I have built, the shaft 16 is designed to rotate at a speed of 381 R. P. M. and in a clockwise direction, while the shaft 17 is designed to rotate at a speed of 92½ R. P. M. in a counterclockwise direction.

Each of the shafts 16 and 17 is designed to operate some device which may be detachably connected to the unit and, usually, such a device is intended to be hinged to the unit so that it may be swung into and out of a position wherein it will be operated by one of the driving shafts. In the form shown, I provide three hinge pins 27, 28 and 29, arranged vertically one beneath the other. It will be seen that the pins 27 and 28 are arranged on opposite sides of the shaft 16, whereas the pins 28 and 29 are arranged on opposite sides of the shaft 17. By this arrangement, the intermediate pin 28 forms a common hinge element which may be used with a device operated by either shaft.

Each of the pins 27, 28 and 29 is supported on an ear 30 projecting from the casing, and on the ear 30 which supports the pin 27 I have shown an upwardly extending lug 31 having its face 32 spaced from the pin 27 and parallel thereto, although this is not essential. The space between the face of the pin 27 and the face 32 of the lug is such that a hinge element cooperating with the pin 27 may be received between the pin and the lug if properly designed to fit into this space, but if not so designed, the lug will prevent the hinge element from coming to rest on the pin to a sufficient extent to prevent the device carried by the hinge element from being operated by the shaft 16.

Certain devices which are adapted to be used in connection with a power unit may be safely operated at different speeds, while others should be operated only at low speeds. Therefore, the devices which may be operated at low speeds are provided with hinge elements in the form of ears 33 of such size that they can be received only on the pins 28 and 29 but will not fit between the pin 27 and the face of the lug 31. This is best shown in dotted lines in Fig. 7. On the other hand, a device which can be safely operated at a relatively high speed at which the shaft 16 rotates is provided with a hinge element in the form of an ear which can be received on the pin 27, without being obstructed by the lug 31. This provides a safety device which is of prime importance on a power unit of this type which is designed for use in the home. For example, the beater 34 shown in Figs. 1 and 2 is one form of a device which may at different times be properly operated at different speeds, and this device can be placed upon either the pins 28 and 29 as in Fig. 1, or the pins 27 and 28 as in Fig. 3. When placed upon one set of pins, it will cooperate with the driving shaft 17, and when placed on the other set it will be driven by the shaft 16, although in the opposite direction.

Incidentally, the safety feature described above is used to prevent the rotation of a device in the wrong direction, a device which should be rotated in one direction only, being designed to operate say with the shaft 17, and its hinge element 33 being designed so that it cannot be placed upon the pin 27. Each device to be operated by the power unit has incorporated therein a driven shaft which is to be operated by either the shaft 16 or 17 through suitable clutch connections.

In Fig. 3 is shown the shaft 35 on the device 34, this shaft being in this instance driven from the shaft 16 through a clutch connection consisting of a pin 36 extending laterally from the shaft 35 and adapted to be received in opposite recesses 37 in the end of the shaft 16. A similar arrangement is shown in Fig. 5, wherein the shaft 38 of a different device is operated with a transversely extending pin 39 adapted to be received within recesses 40 in the end of the shaft 17.

As best shown in Fig. 3, each shaft 16 and 17 is provided with a centrally disposed longitudinally extending bore 41, and this bore will be described with respect to the shaft 16, the shaft 17 being of identical construction.

As will be seen, this bore has a portion substantially of the size of the driven shaft of the device operated by the shaft in which the bore is provided, so that a driven shaft may be inserted in the bore. In Fig. 3, the driven shaft terminates in the outer end of the bore which is enlarged, as shown, to form the recesses 37. It will be noted by reference to Fig. 5, that these recesses are separated by elements 42 which are adapted to engage with the pin 36. The elements 42 and 36 form the coacting clutch elements on the different shafts.

The inner end of the bore 41 is provided with a circumferentially extending groove or recess 43 which has no function when a device such as that shown in Figs. 1, 2 and 3 is used. In such a device, the hinge and a suitable latch to be described later are used to hold the shafts in position. However, there are devices which may be used with a power unit, which it is not necessary or desirable to hinge to the unit such, for example, as a wheel 44, as in Fig. 8. This wheel may be a grinder or polisher, and is of such character that it is more economical to avoid a hinge to support the same. In place of a hinge, the shaft 45 supporting the wheel is provided with a transverse pin 46 forming a clutch element similar to the pin 36, and it is also provided with one or more spring pressed balls 47 forming detents which are adapted to engage in the circumferential groove 43. By this arrangement, the shaft 45 may be inserted in the bore 41, the ball or balls 47 being received in the groove to hold the shaft 45 in position wherein the clutch element 46 will cooperate with the clutch elements 42, and thus the shaft 45 will be driven by the shaft 16.

In certain kinds of devices, it is desirable that the driving shaft on the unit and the driven shaft on the device, be held in clutched relation to each other under all circumstances, whereas with other devices it is desirable that this clutch between the shafts may be broken when an undue load is placed upon the device. In order that the power unit may be useful with both kinds of devices, I provide a novel form of latch which will be best understood from an inspection of Fig. 6. In this figure, I show a latch adapted to hold a device which is hinged on the pins 27 and 28, or a device which is hinged on the pins 28 and 29. The latches are identical and each comprises a member 48 which is mounted between lugs 49 on the casing, and is normally urged in a counter-clockwise direction on its pivot by means of a spring 50. Each device is provided with a pin which is adapted to be received in a recess 51 in the member 48. As plainly shown in Fig. 6, and also in Fig. 1, this recess is relatively narrow at its bottom, the width being such as to fit a pin 52 which may extend to the bottom of the recess. The recess is so shaped that when the pin 52 is at its bottom, a substantially vertical wall of the recess is in contact with the side of the pin away from the unit and toward the device, so that the device will not be released except upon actuation of the latch, which may be done by rotating it on its pivot by means of the thumb piece 53. The lower latch 48 shown in Fig. 6, is shown as engaging a pin 52' which represents the approximate size of a pin used on a device which it is desirable should be disconnected from the power unit when a predetermined load occurs on the device. It will be seen that this pin 52' is disposed in a flared mouth 54 of the recess, and that the pin is of such size that it cannot occupy the position of the pin 52 in the bottom of the recess. By this arrangement, the latch 48 is prevented from rotating as far about its axis under the action of the spring, as is the case when it engages a pin 52, and the latch merely yieldingly holds the device in position, it being evident that upon any undue load occurring on the device, the device may be swung away from the unit without being positively prevented from doing so by the latch.

Such a device and a means for so operating it when an overload occurs thereon, is disclosed and claimed in my copending application, Serial No. 263,322.

When a driving shaft on the unit and a driven shaft on a device are brought into cooperative relation, it is essential that this relation should be maintained. This relation might be disturbed by the operation of a device which would tend to lift the hinge ears from their pins. This is apt to occur, for example, if for any reason the driving and driven shafts are out of alignment, in which case one end of a pin 36 will strike a clutch element 42 before the other end will. In order to insure the correct positioning of the shafts and the maintenance of this position, I provide cooperating elements on the unit and on the device which will prevent movement of the device on its hinges. In this embodiment, each one of the bosses 13 and 14 is provided on its bottom with a flattened portion 55, beneath which is received a lug 56 on the device which is being driven from the shaft within the particular boss. This arrangement is best shown in Figs. 3 and 5.

I claim:—

1. A power unit comprising two parallel driving shafts, each having a clutch element on the end thereof, a device having a driven shaft with a clutch element adapted to cooperate with the element on either of said driving shafts, means to hinge said device to said power unit in either one of two positions, in each of which it may be swung into cooperative relation with one of said shafts, said means comprising three hinge pins on said unit and two hinge ears on said device, one of said pins being adapted to cooperate with one of the ears on said device in either of said positions.

2. In combination, a power unit having two parallel driving shafts, each having clutch elements on the end thereof, three hinge pins mounted on said unit, two adjacent pins being adapted to support a device in position to be operated by one of said driven shafts, and one of said adjacent pins and the third pin being adapted to support a device in position to be operated by the other of said shafts.

3. In combination, a power unit having two parallel driving shafts, each having clutch elements on the end thereof, three hinge pins mounted on said unit, two adjacent pins being adapted to support a device in position to be operated by one of said driven shafts, and one of said adjacent pins and the third pin being adapted to support a device in position to be operated by the other of said shafts, said hinge pins being equally spaced apart.

4. In combination, a power unit having two horizontal parallel driving shafts, each having clutch elements on the end thereof, three vertically extending hinge pins disposed one above the other and equally spaced apart, the top and middle pins being disposed on opposite sides of the upper one of said shafts, and the middle and lower pins being disposed on opposite sides of the lower one of said shafts.

5. In combination, a power unit having a driving shaft, a device hinged to the power unit and having a driven shaft, coacting clutch elements on said driving and driven shafts adapted to operate the driven shaft when the device is swung into a given position, and a spring pressed latch to hold said device in said position, said latch having a slot to receive a pin on said device, said slot having the bottom thereof relatively narrow and the mouth thereof relatively large, for the purpose set forth.

6. In combination, a power unit having a driving shaft, a device hinged to the power unit and having a driven shaft, coacting clutch elements on said driving and driven shafts adapted to operate the driven shaft when the device is swung into a given position, and a spring pressed latch to hold said device in said position, said latch having a slot to receive a pin on said device, said slot having the bottom thereof relatively narrow and the mouth thereof relatively large and flaring, for the purpose set forth.

7. A power unit comprising a motor shaft, a second shaft parallel to said motor shaft, reduction gearing between said shafts, a third shaft parallel to said first named shafts and connected to the second shaft by reduction gearing, clutch elements on the ends of said second and third shafts, and means to hinge a device in position to be operated by either one of said shafts.

8. In combination, a power unit having a driving shaft, a device hinged to said power unit and having a driven shaft, coacting clutch elements on said shafts adapted to be brought into engagement when said device is swung on its hinge into a certain position, a bearing for said driving shaft projecting from said unit, and a lug on said device beneath said driven shaft and disposed beneath said bearing when the shafts are clutched together, thereby preventing vertical motion of the device and the driven shaft on its hinge.

9. In combination, a power unit having a plurality of driving shafts, a hinge associated with each of said driving shafts and adapted to support a device in position to be operated thereby, one of said hinges comprising an element on said unit and an element on said device, and means adjacent one of said elements to prevent its cooperation with one of certain other elements to complete the operative hinge.

10. In combination, a power unit having a driving shaft, a device having a driven shaft adapted to be operated by said driving shaft and detachably connected thereto, a lug on said unit having a hinge pin extending therefrom, a hinge ear on said device adapted to be seated on said pin, and a projection on said lug spaced from the pin and with the pin defining a space within which the ear may move, for the purpose set forth.

11. In combination, a power unit having a plurality of driving shafts each shaft having a clutch element thereon adapted to operate a driven shaft on an operative device, means for simultaneously driving said shafts at different speeds, means associated with each shaft and adapted to support a device in position to be operated thereby, and means on said unit and device cooperating to prevent supporting of the device in operative position with respect to a shaft operating at a speed for which said device is not adapted.

12. In combination, a power unit having a plurality of driving shafts, each shaft having a clutch element thereon adapted to operate a driven shaft on an operative device, means for simultaneously driving said shafts in opposite directions with one shaft operating at a relatively high speed and the other at a relatively low speed, means associated with each shaft and adapted to support a device in position to be operated thereby, and means on said unit and device cooperating to prevent supporting of the device in operative position with respect to a shaft operating at a speed for which said device is not adapted.

13. A household power unit comprising a base having a motor thereon, said motor having a shaft, a second shaft parallel to and extending beyond the end of the motor shaft and disposed above it, reduction gearing between said shafts, a third shaft disposed beneath said second shaft and adjacent the end of the motor shaft, reduction gearing between said second and third shafts, clutch elements on the ends of said second and third shafts, and means to support a device in position to be operated by either one of said second or third shafts.

14. In combination, a power unit having a driving shaft, means to hingedly support any one of a plurality of devices, each having a driven shaft, in position for its driven shaft to be operated by said driving shaft, coacting clutch elements on said driving shaft and on each of said driven shafts adapted to operate a driven shaft when the corresponding device is swung into a given position, and a spring-pressed latch to hold said device in said position, each device having thereon a member to cooperate with said latch to thus hold the device, said latch having means to positively lock certain of said members to prevent disengagement of said clutch elements until the latch is released and also having means to yieldingly engage certain other members on other devices to yieldingly hold such other devices in position with said clutch elements in engagement.

ROBERT HOE.